United States Patent [19]

Iverson et al.

[11] Patent Number: 4,949,390

[45] Date of Patent: Aug. 14, 1990

[54] INTERCONNECT VERIFICATION USING SERIAL NEIGHBORHOOD PROCESSORS

[75] Inventors: R. David Iverson, Roseville, Minn.; Roland T. Chin, Madison, Wis.; Matthew McPhearson, Brooklyn Center; Dan Stover, Fridley, both of Minn.

[73] Assignee: Applied Vision Systems, Inc., Minneapolis, Minn.

[21] Appl. No.: 378,462

[22] Filed: Jul. 11, 1989

Related U.S. Application Data

[63] Continuation of Ser. No. 39,572, Apr. 16, 1987, abandoned.

[51] Int. Cl.$^5$ .............................................. G06K 9/54
[52] U.S. Cl. ..................................... 382/49; 364/133; 382/55
[58] Field of Search .................... 382/49, 41, 55, 27; 364/133, 140, 518

[56] References Cited

U.S. PATENT DOCUMENTS

| | | | |
|---|---|---|---|
| 3,106,698 | 10/1963 | Unger | 340/172.5 |
| 3,196,398 | 7/1965 | Baskin | 382/55 |
| 3,287,703 | 11/1966 | Slotnick | 340/172.5 |

(List continued on next page.)

FOREIGN PATENT DOCUMENTS 1445685  7/1976  United Kingdom .

OTHER PUBLICATIONS

"Data-Flow Architecture Unclogs the Bottleneck of Von Neumann Systems", by C. Patton, in *Electronic Design*, 2/23/84.

"Digital Signal Processor Nimbly Jumps Over CPU Overhead Hurdles", by R. Pickvance, in *Electronic Design*, 9/20/84.

"Computer Architectures for Image Understanding Systems", by ERIM.

"An Introduction to ERIM", from ERIM.

"Intelligent Machine Technology", by ERIM.

Jon Mandeville, in IBM Journal of Research & Development, vol. 29, No. 1, Jan. 1985.

"Convolver for Pipelined-Image Processor", published p. 66, NASA Tech Briefs, Winter 1985.

"A High Speed Recirculating Neighborhood Processing Architecture", by Robert M. Lougheed.

"Biomedical Image Processing", by S. R. Sternberg, in IEEE *Computer*, Jan. 1983.

"500-kHz Single-Board FFT System Incorporates DSP-Optimized Chips", by Cohen & Perlman, in *EDN*, 10/31/84.

"Multiport Register File Streamlines Signal Processing", by Dedrick, in *EDNS*, 11/15/84.

Steinvorth, et al., An Architecture for a Video Rate Fuzzy Golay Processor, 1985.

Mandeville, J. R., Novel Method for Analysis for Printed Circuit Images, Jan., 1985.

*Primary Examiner*—Leo H. Boudreau
*Assistant Examiner*—Joseph Mancoso
*Attorney, Agent, or Firm*—Merchant, Gould, Smith, Edell, Welter & Schmidt

[57] ABSTRACT

A serial data image processing system is described whereby interconnect artwork for electronic component manufacturing is scanned by a 1×n CCD image pickup element and converted into serial digital data. The serial digital data representing the original image is processed by a programmable serial image processor to detect flaws in the original image artwork. The serial data digital image processor is comprised of a plurality of pipe elements, the configuration of which can be arranged for parallel or serial processing. Each pipe element contains a plurality of 4×5 pixel neighborhood array processing blocks, each of which can be programmed to perform one of a number of neighborhood image enhancement techniques. The 4×5 pixel neighborhood provides single-pass thinning and trimming algorithms which in turn allows for more efficient processing to be performed in the serial pipeline combination of a plurality of transformation neighborhoods.

10 Claims, 7 Drawing Sheets

U.S. PATENT DOCUMENTS

| | | | |
|---|---|---|---|
| 3,602,638 | 8/1971 | Pascoe et al. | 250/202 |
| 3,761,876 | 9/1973 | Flaherty et al. | 340/146.3 MA |
| 3,790,704 | 2/1974 | Collomosse et al. | 178/6.8 |
| 3,846,754 | 11/1974 | Oka et al. | 382/55 |
| 3,899,771 | 8/1975 | Saraga et al. | 340/146.3 AE |
| 3,909,602 | 9/1975 | Micka | 235/151.3 |
| 3,975,709 | 8/1976 | Beun et al. | 382/55 |
| 3,987,412 | 10/1976 | Morrin, II | 382/55 |
| 4,056,716 | 11/1977 | Baxter | 364/515 |
| 4,059,787 | 11/1977 | Aimar | 318/568 |
| 4,060,713 | 11/1977 | Golay | 364/416 |
| 4,090,174 | 5/1978 | Van Voorhis | 340/146.3 MA |
| 4,148,065 | 4/1979 | Nakagawa et al. | 358/101 |
| 4,162,482 | 7/1979 | Su | 382/49 |
| 4,163,212 | 7/1979 | Buerger et al. | 340/146.3 H |
| 4,167,728 | 9/1979 | Sternberg et al. | 382/41 |
| 4,174,514 | 11/1979 | Sternberg | 382/49 |
| 4,215,401 | 7/1980 | Holsztynski et al. | 382/49 |
| 4,218,142 | 8/1980 | Kryger et al. | 356/394 |
| 4,242,662 | 12/1980 | Tsujiyama et al. | 340/146.3 H |
| 4,277,175 | 7/1981 | Karasaki et al. | 356/378 |
| 4,290,049 | 9/1981 | Sternberg et al. | 382/41 |
| 4,295,198 | 10/1981 | Copeland et al. | 364/515 |
| 4,300,122 | 11/1981 | McMahon | 340/146.3 MA |
| 4,301,443 | 11/1981 | Sternberg et al. | 382/49 |
| 4,322,716 | 3/1982 | Sternberg | 382/49 |
| 4,345,312 | 8/1982 | Yasuye et al. | 364/515 |
| 4,364,086 | 12/1982 | Guth | 358/101 |
| 4,369,430 | 1/1983 | Sternberg | 382/49 |
| 4,390,955 | 6/1983 | Arimura | 364/490 |
| 4,395,697 | 7/1983 | Dargel et al. | 382/49 |
| 4,395,698 | 7/1983 | Sternberg et al. | 382/49 |
| 4,395,699 | 7/1983 | Sternberg | 382/49 |
| 4,395,700 | 7/1983 | McCubbrey et al. | 382/49 |
| 4,398,176 | 8/1983 | Dargel et al. | 382/49 |
| 4,403,294 | 9/1983 | Hamada et al. | 364/507 |
| 4,421,410 | 12/1983 | Karasaki | 356/378 |
| 4,430,749 | 2/1984 | Schardt | 382/54 |
| 4,441,207 | 4/1984 | Lougheed et al. | 382/49 |
| 4,442,542 | 4/1984 | Lin et al. | 382/8 |
| 4,442,543 | 4/1984 | Sternberg et al. | 382/49 |
| 4,445,185 | 4/1984 | Davis, Jr. et al. | 364/514 |
| 4,454,590 | 6/1984 | Belt | 382/41 |
| 4,464,788 | 8/1984 | Sternberg et al. | 382/49 |
| 4,464,789 | 8/1984 | Sternberg | 382/49 |
| 4,479,145 | 10/1984 | Azuma et al. | 358/106 |
| 4,481,664 | 11/1984 | Linger et al. | 382/8 |
| 4,484,349 | 11/1984 | McCubbrey | 382/49 |
| 4,496,971 | 1/1985 | West et al. | 358/106 |
| 4,510,616 | 4/1985 | Lougheed et al. | 382/49 |
| 4,532,650 | 7/1985 | Wihl et al. | 382/8 |
| 4,538,909 | 12/1985 | Bible et al. | 356/237 |
| 4,542,404 | 9/1985 | Duschl | 358/106 |
| 4,570,180 | 2/1986 | Baier et al. | 358/106 |
| 4,578,810 | 3/1986 | MacFarlane et al. | 382/8 |
| 4,579,455 | 4/1986 | Levy | 356/394 |
| 4,587,617 | 5/1986 | Barker et al. | 364/507 |
| 4,618,938 | 10/1986 | Sandland et al. | 364/552 |
| 4,623,256 | 11/1986 | Ikenaga et al. | 356/394 |
| 4,628,531 | 12/1986 | Okamoto et al. | 382/8 |
| 4,665,551 | 5/1987 | Sternberg et al. | 382/27 |
| 4,665,556 | 5/1987 | Fukushima et al. | 382/49 |
| 4,668,982 | 5/1987 | Tinnerino | 358/101 |
| 4,685,144 | 8/1987 | McCubbrey et al. | 382/49 |
| 4,692,943 | 9/1987 | Pietzsch et al. | 382/8 |
| 4,707,734 | 11/1987 | Labinger et al. | 358/106 |
| 4,718,091 | 1/1988 | Kobayashi et al. | 382/49 |
| 4,741,044 | 4/1988 | Polomsky et al. | 358/106 |
| 4,744,047 | 5/1988 | Okamoto et al. | 364/900 |

EXPANSION AND CONTRACTION PRIMITIVES

4-EXPAND: SET X TO ONE IF ANY Y IS EQUAL TO ONE

4-CONTRACT: SET X TO ZERO IF ANY Y IS EQUAL TO ZERO

8-EXPAND: SET X TO ONE IF ANY Y IS EQUAL TO ONE

8-CONTRACT: SET X TO ZERO IF ANY Y IS EQUAL TO ZERO

SINGLE PIXEL REMOVAL AND SAVING

POINT REMOVAL: SET X TO ZERO IF ALL Y'S ARE EQUAL TO ZERO

POINT SAVING: IF X IS EQUAL TO ONE AND ALL Y'S ARE EQUAL TO ZERO THEN LET X REMAIN EQUAL TO ONE

ONE-PASS THINNING PRIMITIVE

SET Y TO ZERO IF ONE OF THE THINNING TEMPLATES IS MATCHED AND NO RESTRICTION TEMPLATE IS MATCHED (BLANKS ARE DON'T CARES)

THINNING TEMPLATES

T1:
| 1 | Y | 1 |
|---|---|---|
|   | 1 | O |
|   | O | O |
|   | O |   |

T1:
|   | 1 |   |
|---|---|---|
| 1 | Y | 1 |
| O | O | O |

T2:
| O | O | O |
|---|---|---|
| 1 | Y | 1 |
|   | 1 |   |

T3:
| O | O |   |
|---|---|---|
| O | Y | 1 |
|   | 1 |   |

T4:
|   | 1 |   |
|---|---|---|
| O | Y | 1 |
| O | O |   |

T5:
|   | 1 |   |
|---|---|---|
| 1 | Y | O |
|   | O | O |

T6:
|   | 1 |   |
|---|---|---|
| 1 | Y | O |
| O | O |   |

T7:
|   | O | O |
|---|---|---|
| 1 | Y | O |
|   | 1 |   |

T8:
| O | O |   |
|---|---|---|
| 1 | Y | O |
|   | 1 |   |

THINNING RESTRICTIONS

ONE-PASS TRIMMING PRIMITIVE

TRIMMING TEMPLATES: SET Y TO ZERO IF ONE OF TRIMMING TEMPLATES IS MATCHED AND NO RESTRICTION TEMPLATE IS MATCHED (BLANKS ARE DON'T CARES)

\* TRIM ONLY WHEN AT LEAST ONE a IS EQUAL TO ONE

TRIMMING RESTRICTIONS

T- JOIN TEMPLATES

FIG. 8

B- JOIN TEMPLATES

INTERCONNECT VERIFICATION USING SERIAL NEIGHBORHOOD PROCESSORS

This is a continuation of application Ser. No. 039,572, filed Apr. 16, 1987, now abandoned.

BACKGROUND OF THE INVENTION

The present invention relates generally to the field of digital image enhancement and image processing. More particularly, this invention relates to programmable serial neighborhood transformation processing systems.

Prior art serial neighborhood image processors enhance visual images in digital fashion using various algorithms operating on pixels representing the original image. These image processors first divide the original image into an array of pixels and a digital value is assigned to each pixel based on a luminance scale. The number of pixels for a given area and the range of the luminance scale for each pixel determines the spatial and amplitude resolution for the image processor. The process of converting the original image into a digital representation of the image is done using any device with serial data image conversion. For serial neighborhood transformation processors, the entire image is raster scanned a single line at a time and the serial raster data is fed through an n×m neighborhood of pixels. The serial data representing the original image is transformed using the n×m neighborhood to perform pattern matching and pattern analysis. The center of the n×m neighborhood is used as the transformation point from the neighborhood and a transformation takes place based on the surrounding pixels in the neighborhood.

Image processors are used for a wide variety of sciences including military applications, weather forecasting, automated materials handling, and a host is well suited to digital image processing technology is that of manufacturing defect detection on artwork and layers of printed wiring boards (unpopulated printed circuit boards), hybrid circuits and integrated circuit masks. These last applications use image processing techniques to detect manufacturing defects in the pattern or artwork used for fabricating electronic circuit modules or for detecting flaws in the manufactured circuits. The integrity of these patterns is crucial to the proper operation of the end product and is typically found to be a large percentage of the overall cost of producing electronic circuits and components.

Typical manufacturing defects found on PWB's or wafer masks are mouse bites, pinholes, opens, shorts, cracks, misalignment errors and various other types of problems typically occurring in wiring patterns. The aforementioned terms are terms of art that cause particular types of faults in the electronic components which manifest themselves in various ways. Often several distinct failure detection techniques are required to indicate and isolate the manufacturing defect. Many of the aforementioned manufacturing defects, however, can be detected and isolated by digital image processing techniques by visually scanning the product during manufacturing.

Some of the aforementioned manufacturing defects typically found on PC boards or wafer masks have been postulated to be detectabale using various neighborhood transformation algorithms as described mathematically in an article authored by Jon R. Mandeville found in the IBM Journal of Research and Development, Vol. 29, No. 1, Jan. 1985, pp. 73-86. Various image enhancement algorithms using specific image processing primitives (neighborhood transformations) are described in the article, such as expansion, contraction, thinning and trimming. These image processing primitives when combined for use in feature detection algorithms can be used to identify and locate various faults in artwork. However, the thinning and trimming primitives require several stages of the traditional 3×3 neighborhood transforms, resulting in extensive hardware overhead that can be avoided with the present invention.

The present invention improves upon the prior art by combining the use of an extended neighborhood of pixels to achieve single stage thinning and trimming with a more efficient architecture, resulting in lower-cost real time image processing. The present invention relates generally to the improvement of serial neighborhood transformation processors and is not intended to be limited to the particular application of electronic PWB fault detection.

SUMMARY OF THE INVENTION

The present invention provides an improved binary serial data digital image processing system in which a 1×n CCD light detection element scans and digitizes an image into a serial stream of binary pixel elements which are processed by a programmable neighborhood serial image processing system for the enhancement of the original image and/or the detection of manufacturing flaws. The system can be programmed to perform image processing algorithms in parallel based on a plurality of programmable neighborhood image processing primitives. The image processing system performs these image enhancement techniques at real time speed on the serial pixel data. A plurality of neighborhood processing stages (programmable to perform a plurality of image processing primitives) are arranged in a serial fashion to perform a variety of image processing algorithms on the serial pixel image data. The number and type of algorithms that can be performed are user configurable.

Another feature of the present invention is an extended nxm neighborhood transformation processor whereby thinning and trimming primitives are performed in a single neighborhood stage. The single pass thinning and trimming primitives are implemented using a plurality of matching templates and restriction templates which detect valid thinning and trimming conditions on the pixel data image.

Although in the preferred embodiment the present invention is applied to the detection of errors in electronic artwork, it will be appreciated by those skilled in the art that the present invention is applicable to many types of image enhancement applications that use binary serial data image processing neighborhood transformations.

DETAILED DESCRIPTION OF THE PREFERRED EMBODIMENT

In the preferred embodiment of the present invention, a CCD image detection device is arranged as a 1×4096-bit scanning head with the printed wiring boards (PWB's) passing thereunder. The CCD detection circuit converts the image into a 1×4096-pixel scan line for each period of time that the electronic component artwork is stepped past the CCD image detection device. Each of the 4,096 pixels is assigned an 8-bit gray scale luminance code based on its light reflectivity. Each 8-bit code for each corresponding pixel in the 1×4096 scan line is serially shifted to a threshold detection circuit. The threshold detection circuit converts the 8-bit code for each pixel into a 1-bit code corresponding to whether the original reflectivity of the pixel on the scanned image lies above or below a given threshold. The threshold corresponds to whether the original pixel had scanned, for example, a portion of a metal pattern, or had scanned a portion of non-metalized substrate.

Figure 1:
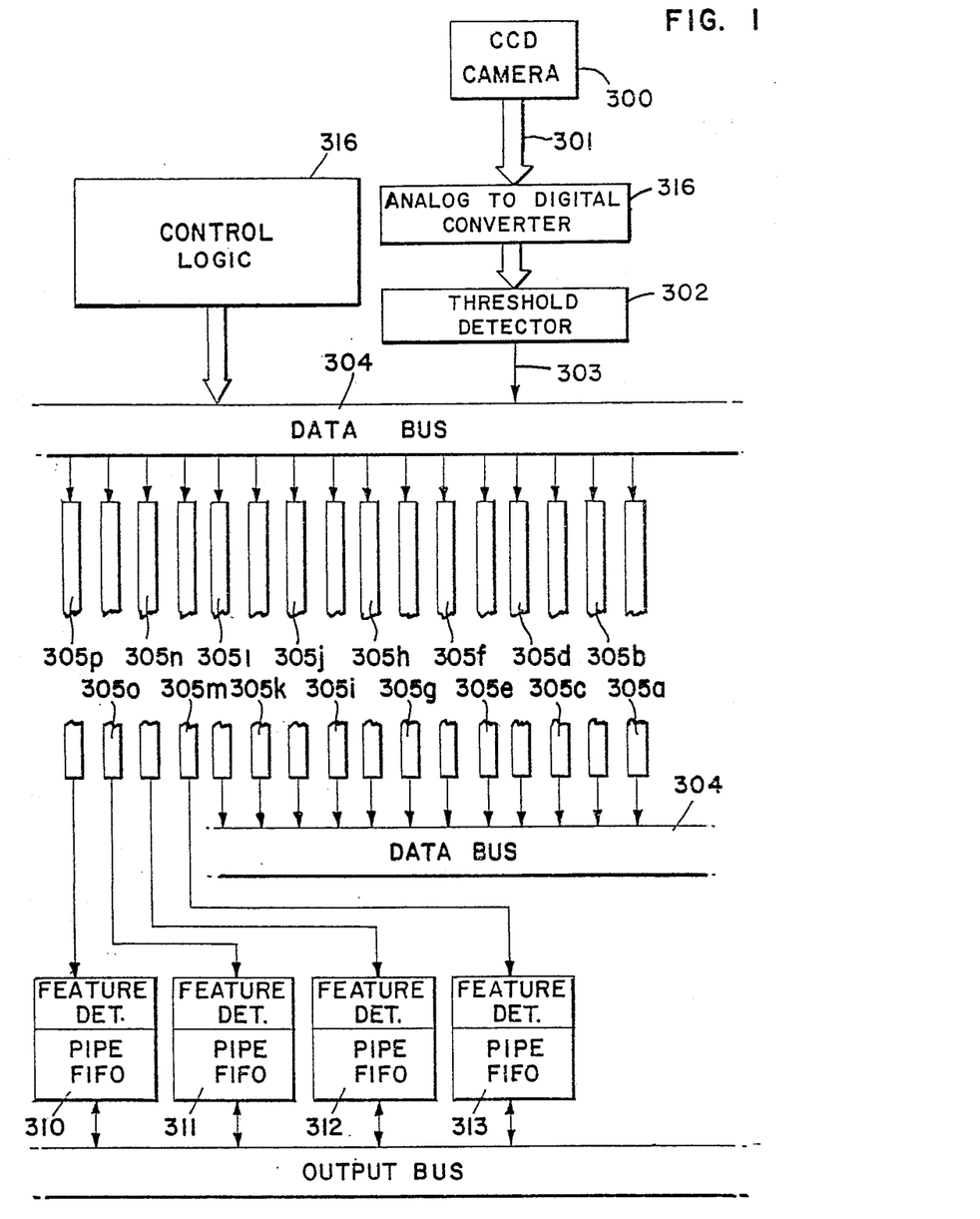
FIG. 1 is a detailed block diagram of the image processing system showing the plurality of pipe elements and feature detectors.

FIG. 1 is a detailed block diagram of the image processing system. The CCD image analog pixel data is serially fed pixel by pixel from the 1×4,096 pixel scan detection circuit 300 to the image processor board along data path 301. The CCD analog data is converted to 8-bit grey-scale digital format by the analog to digital converter circuit 316. The 8-bit grey-scale serial data 317 is transformed by threshold detector 302 into a 1-bit serial data passed along 1-bit data path 303. The threshold level is user programmable and can be set to any level on the luminance grey-scale. 1-bit serial data 303 is then placed on a dedicated line on data bus 304 for use by pipe elements 305a through 305p. It will be appreciated by those skilled in the art that although in the preferred embodiment disclosed here the image data source is from a real-time CCD scanner, the image data may be sourced by other types of scanners and from stored images fixed in memory.

In the preferred embodiment, the image processor contains sixteen pipe elements for processing the serial image data. These pipe elements 305a–305p take data from data bus 304, and pipe elements 305a–305l return data back to data bus 304 (shown in FIG. 1 as lying both above and below the pipe elements for clarity). Four pipe elements 305m–305p among the group of sixteen pipe elements have dedicated outputs connected to feature detectors 313, 312, 311, 310, respectively. In particular, pipe element 305p is connected to feature detector 310; pipe element 305o is connected to feature detector 311; pipe element 305n is connected to feature detector 312; and pipe element 305m is connected to feature detector 313. The feature detectors are special types of pipe elements designed to locate specific pixel configurations in the scanned image. In the present preferred embodiment, the limit of four feature detectors limits this system to four pipelines operating in parallel at any given time, although those skilled in the art will quickly recognize that this number can be increased or decreased.

All of the pipe elements in the image processor system are programmable in their transformation functions and their interconnect, and are identical in their construction. For example, pipe element 305a may receive camera data from data bus 304 and place the transformed image back onto data bus 304, where the transformed data may be selected by pipe element 305p. In this fashion, multiple pipe elements can be cascaded to perform complex image transformations. Each pipe element is assigned a dedicated data line on the data bus in the preferred embodiment. Hence, the output of pipeline 305a would be to a dedicated line (not shown) and if pipeline 305p were to take the output data from pipeline 305a, it would select the dedicated data bus line corresponding to pipe element 305a. Pipe elements 305m through 305p do not have dedicated data lines on the data bus 304 since their outputs go directly to the feature detectors. In addition, the data bus contains a dedicated data line corresponding to the CCD camera data input from line 303.

The configuration of these image processing pipe elements 305 is programmable by the user through the use of control commands. Control information is downloaded along the data bus 304 to the individual pipe elements from the control logic 316. In the preferred embodiment of the present invention, 16 pipe elements are provided which can be arranged as parallel processors processing the same data simultaneously and performing separate functions; or the pipe elements may be arranged in any combination of serial processors performing image enhancement transformations on the serial data after another processor has completed its processing of the serial data. The flexibility of the arrangements of pipe elements provides for the ability to perform complex image enhancement techniques at high speeds with up to four complete cascaded pipelines.

Figure 2:
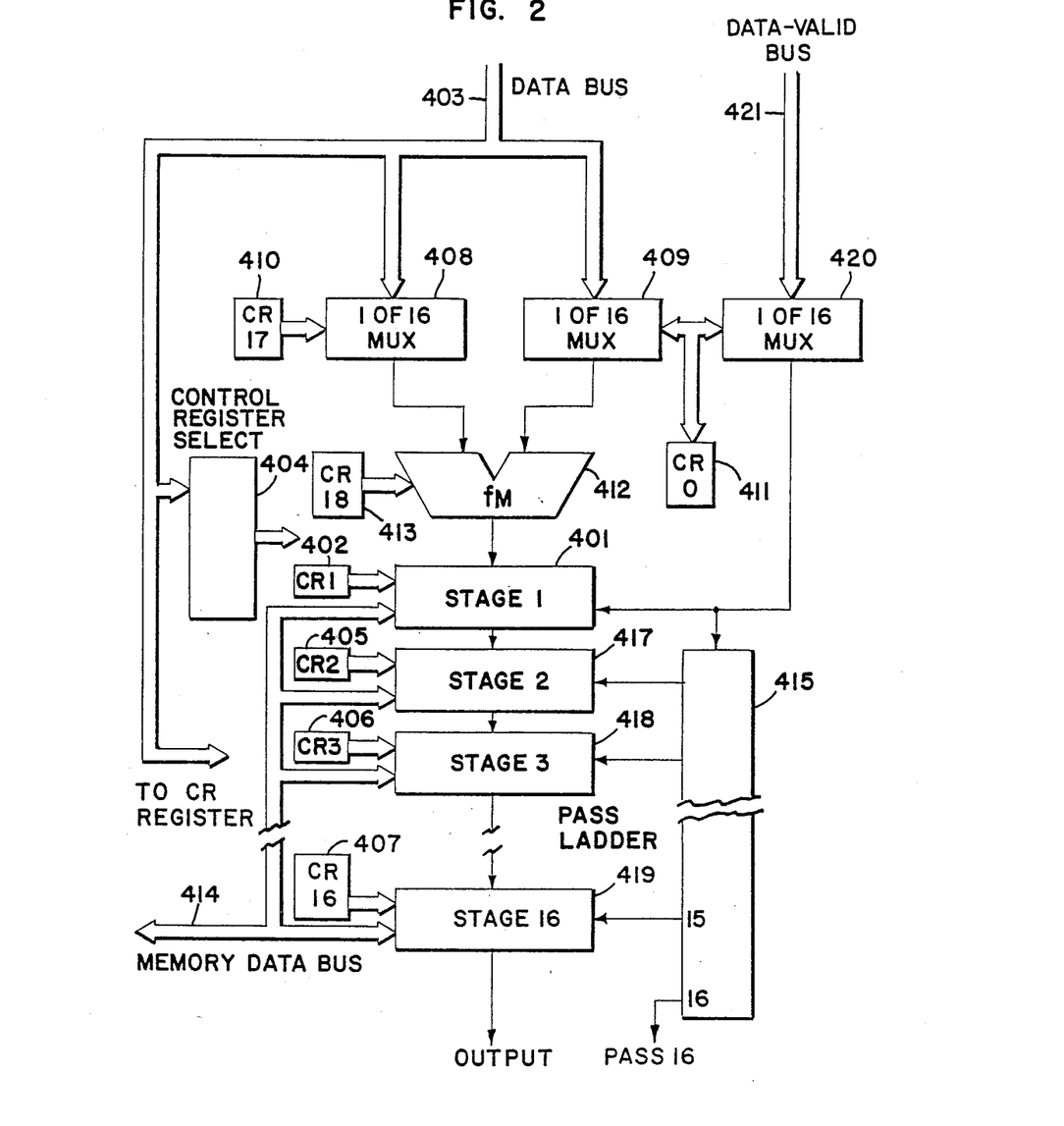
FIG. 2 is a detailed block diagram describing an individual pipe element with the 16 neighborhood transformation stages.

A detailed block diagram of an individual pipe element is shown in FIG. 2. Each pipe element contains a plurality of 4×5 pixel array processing stages (401, 417, 418, etc.). Each of these processing stages is fully programmable to perform one of a number of digital image processing enhancement algorithms. The algorithms are based on the neighborhood concept of modifying digital pixel data based on the pixel value of the several pixel neighbors. Each programmable pixel array processing stage can perform an image enhancement primitive only once on the serial data as it passes through the pixel neighborhood stage. Each pipe element in the preferred embodiment contains a series of sixteen programmable pixel array processing stages arranged in a serial order. Each 4×5 pixel processing stage can perform the following digital image processing primitives: (1) 8-neighbor contract; (2) 4-neighbor contract; (3) 8-neighbor expand; (4) 4-neighbor expand; (5) 1-pass thin; (6) 1-pass trim; (7) single pixel remove; (8) single pixel save; and (9) no operation (NOP). The contract, expand, single pixel remove and single pixel save functions only require a 3×3 pixel array to perform indicated function; however, the thin and trim functions require a 4×5 pixel array, as described in detail below.

Each of the neighborhood stages shown in FIG. 2 are independently programmable. The first neighborhood stage 401 can be programmed to perform any one of the aforementioned image processing primitives by loading control register 402 with the appropriate control data. The control data is sent to the various control registers for the transformation stages through the data bus 403, via the control register selector 404. The data bus doubles as both data bus and instruction bus at different time frames. Once the various stages are programmed to operate in their predetermined fashion, the data bus is dedicated to transferring pixel data only. In programming mode, the data bus transfers the control information to the control register selector 404, which in turn selectively loads all of the control registers for a single pipe element. Control registers 402, 405, 406, 407 and others can be programmed to any one of the image transformations or they can be programmed to simply pass data unaltered.

The data selected for processing by the pipe element is selected by the data multiplexers 408 and 409 under control of control registers 410 and 411 respectively. The multiplexers 408, 409 take their respective data off data bus 403 which may come from either the camera data source or from any one of the other pipe elements attached to dedicated lines on the data bus. One-bit ALU 412 under control of control register 413 can be programmed to perform any one of four operations on the incoming data. Data multiplexer 408 taking data from one data source and multiplexer 409 taking data from another data source can either have the data combined, subtracted, exclusive ORed or inverted by ALU 412. In addition to the aforementioned functions of the ALU, data from a single source may be inverted or passed unaltered through ALU 412 for use by the various stages.

The data is synchronized throughout the system by use of a DATA-VALID bus 421. The DATA-VALID signals correspond to the time that the data was originally scanned. Selector 420 selects the appropriate DATA-VALID line corresponding to the data line selected by selector 409 on the data bus 403 and is controlled by the same control register 411. The nature of the DATA-VALID signal is a flag indicating the beginning and end of one scan line. Data passing through the stages experience a delay of several clock cycles due to the inherent nature of a serial neighborhood processor. This process will be described in detail later where an individual neighborhood is described. To provide for proper coordination of data flowing through the pipe elements, the DATA-VALID bus 421 is used for synchronizing control. DATA-VALID signals passing through the system suffer the same delay as the data when passing through the pipe elements such that the DATA-VALID signals and the data stay in concert throughout the system. The pass ladder 415 is used to coordinate the data with the DATA-VALID signals by delaying the DATA-VALID signals by the same amount of delay experienced by the data passing through the transformation stages.

Memory data bus 414 and memory address bus are used to store the portion of the scan lines that are not being operated on by the various stages at the particular transformation time. This data is written into and read out of the stages in serial fashion according to the nature of the raster scan of the image. The memory (not shown) is comprised of industry standard memory chips arranged for high-speed serial access. The data is written at fixed memory locations and the addresses are cycled to read and write the data.

The data output of the first transformation stage 401 drives the input to the second stage 417 from the center of interest of the 4×5 neighborhood found in the first stage. In a like fashion, the output of the second stage 417 drives the input to the third stage 418 from the center of interest of the 4×5 pixel neighborhood. The output of the last stage 419 in the pipe element also is derived from the center of interest of the 4×5 pixel neighborhood. The output of the sixteenth or last stage of the pipe element is returned to the data bus for use by other pipe elements or is sent to a dedicated entity detector if this particular pipe element was so dedicated.

Figure 3:
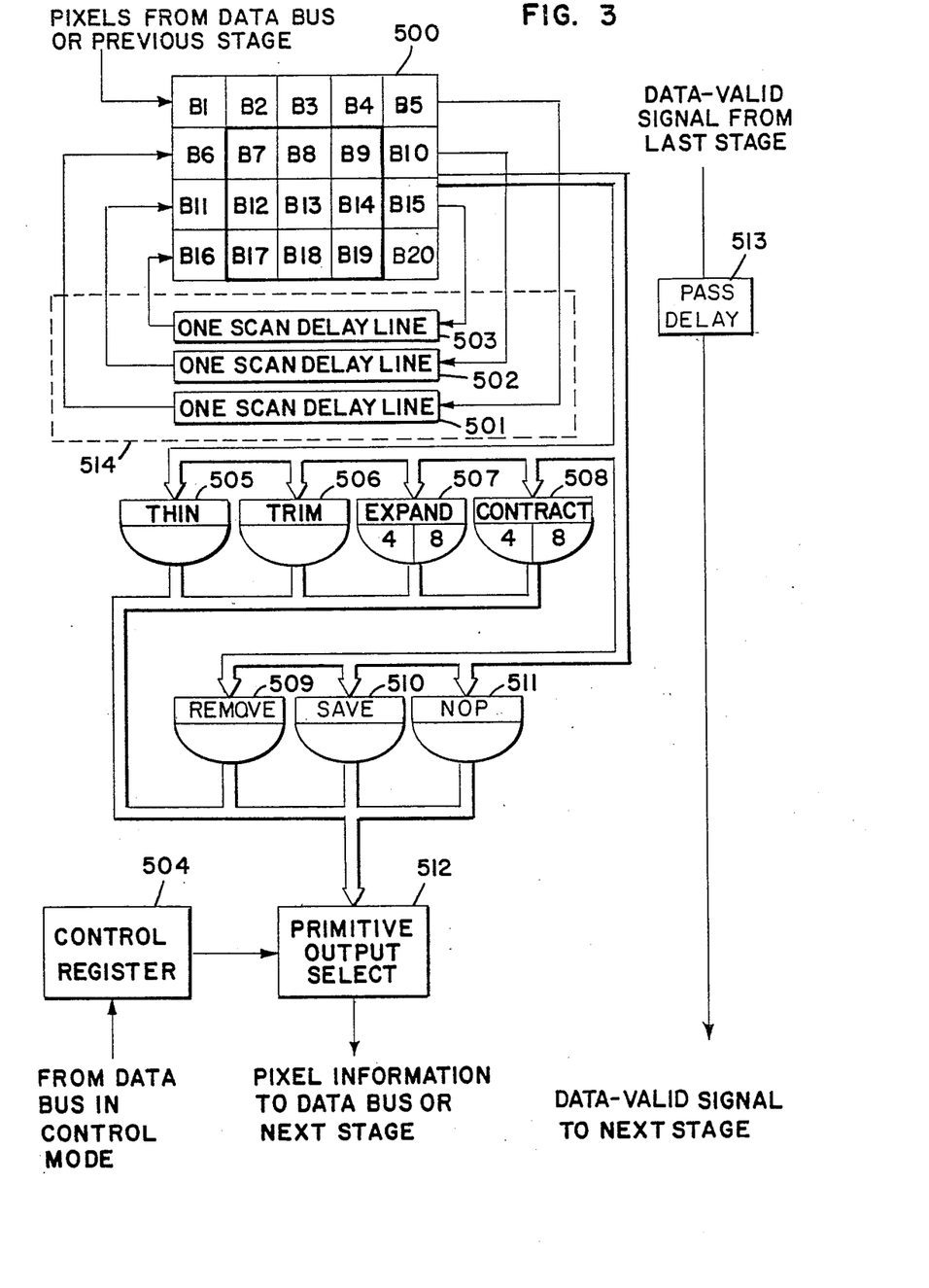
FIG. 3 shows a detailed description of a single neighborhood transformation stage used in a pipe element.

FIG. 3 is a detailed description of a single transformation stage of a pipe element. The 4×5 pixel array 500 is shown in the upper left of the diagram. Each block in the 4×5 pixel array represents a 1-bit register for holding a single pixel. Three of the lines in the 4-line by 5-column pixel array have a 4091-bit serial shift register or memory attached in series. The serial pixel data enters the pixel array processing block in the line 1, column 1 location (labeled B1) and is shifted to the line-1, column 2 pixel location (labeled B2). The serial pixel data is shifted along the line and the output of the line 1, column 5 (B5) pixel is loaded into the first 4,091-bit shift register or memory 501 attached thereto. The output of the first 4,091-bit shift register or memory 501 is serially shifted into the line 2, column 1 location (B6) of the pixel array 500. Lines 2 and 3 also have a 4,091-bit serial shift register or memory (502 and 503 respectively) attached for holding the serially shifted pixel data. The output of the line 3 shift register 503 is passed to the line 4, column 1 pixel position (B16). The line 4, column 5 pixel position (B20) shifts the serial pixel data out where it is discarded.

In an alternate embodiment, the present invention may be implemented with the transformation stages of each 4×5 pixel neighborhood having the serial shift registers take their data from the first pixel location in each line. In this embodiment, the serial shift registers would be 4,095 bits long and would contain nearly one complete scan line. The shift registers would continue to feed the 4×5 neighborhood on the first pixel locations in each line and take the data from each pixel location on that line. In this embodiment, location B1 of transformation neighborhood 500 would receive the input pixel data and would drive both location B2 and scan delay line 501. In a like fashion, pixel location B6 would receive its data from scan delay line 501 and drive both pixel location B7 and scan delay line 502. The output of locations B5, B10, B15 and B19 on transformation neighborhood 500 would all be discarded.

The center of the neighborhood for the algorithm, that is, the pixel of interest, is located at line 3, column 3 (B13). This location (B13) serves as the output of this stage for the relative point in the next stage. The output is modified according to the image processing primitive programmed for the present pixel array processing stage. The modified value of the pixel of interest is then shifted into the next pixel array processing stage in the pipe element. Each programmable 4×5 pixel array processing block is identical to the aforementioned. The serial pixel data is passed on from pixel array processing stage to pixel array processing stage until the data exits the pipe element. The data exiting the pipe element is placed on the data bus on a dedicated line where it can be passed under program control to another pipe element. Data exiting pipe elements 305m through 305p is passed to the respective dedicated feature detectors 310 through 315.

The raster scan digital representation of the original image is stepped pixel by pixel through the pixel array neighborhood 500 shown in FIG. 3 according to the data path described above. The pixel data is stepped through the neighborhood 500 under synchronous control of a clock (not shown). Between clocking pulses with all pixel data at rest, the pixel array processing block performs an image transformation on the pixel neighborhood according to the transformation type programmed into control register 504. Control register 504 within a single stage corresponds to the control registers 402, 405, 406, 407, etc., shown in FIG. 2.

The transformation logic shown in FIG. 3 is comprised of seven separate decision trees. The thin decision tree 505 operates in parallel with the trim decision tree 506, the expand decision tree 507, the contract decision tree 508, the pixel remove decision tree 509, the pixel save decision tree 510, and the NOP (no operation) decision tree 511. All the aforementioned decision trees receive the 20 pixel values from the neighborhood and perform a logical decision on whether to modify the output from the pixel value found in the center of interest of the neighborhood. All seven decision trees make their decision based on their hardwired logic structure, but only one of the decisions may be used. The primitive output select 512, under control of the control register 504, selects one of the seven decision tree outputs for passing the modified or unmodified pixel data of the center of interest on to the next stage or on to the data bus.

As the data passes through the processing block stage from input to output, it can be seen in FIG. 3 that the relative pixel data from one stage to the next is delayed by an amount equal to 2-line plus 3-pixels. The signal line shown on the right side of FIG. 3 synchronizes the scan lines as they are passed through the neighborhood stages. This signal line presents a DATA-VALID signal which is synchronized to the beginning and the end of the scan line data. This signal flows through the pipe elements of the image processor in parallel with the pixel data and corresponds to the PASS LADDER 415 shown in FIG. 2. Since the DATA-VALID signal and the pixel data must remain synchronized throughout the processing stages, each stage in the pipe element provides for an appropriate amount of synchronizing delay to keep the clock signal and the pixel data in synchronization. Hence, the delay block 513 delays the DATA-VALID signal by an amount of time corresponding to a 3-pixel delay suffered by the data. As a result, the next stage in the pipe element receives the serial pixel data and the clock signal in perfect synchronization delayed by a 3-pixel amount.

In an alternate embodiment, the serial shift registers are connected to the pixels in the first column of the pixel array neighborhood. The shift registers in this embodiment would be 4,095 bits wide with 4 of the bits of each line residing simultaneously in the shift register and in the neighborhood. For this embodiment, delay block 513 would still delay the DATA-VALID signal by 3 pixels.

The one-scan delay line shift registers 501, 502 and 503 shown in FIG. 3 are in the preferred embodiment implemented in commercially available memory chips. The data in the memory chips does not actually shift or change positions, as in a traditional shift register, but stays in a stationary position while the address lines scan through the memory. The memories 501, 502 and 503 are shown in FIG. 3 enclosed in the dashed line labeled 514, since they are normally not found as a part of the image processing stages shown in FIG. 2. The memory data bus 414 shown in FIG. 2 represents the passing of data from the neighborhood 500 to the memory groups 514. Memory data bus 414 corresponds to the data lines exiting neighborhood 500 from the right and entering neighborhood 500 from the left shown in FIG. 3. The memory group 514 is sequentially addressed by counters which are continually clocked in synchronization with the pixel data flowing through the stages. The counters step through the memory addresses to continually read and write the pixel data. As is well known to those skilled in the digital arts, the memory address counters all operate in synchronization with the pixel data by means of global synchronization clocks (not shown). All operations of this machine are synchronized by these clocks, including the stepping of pixel data through neighborhood 500.

Figure 4:
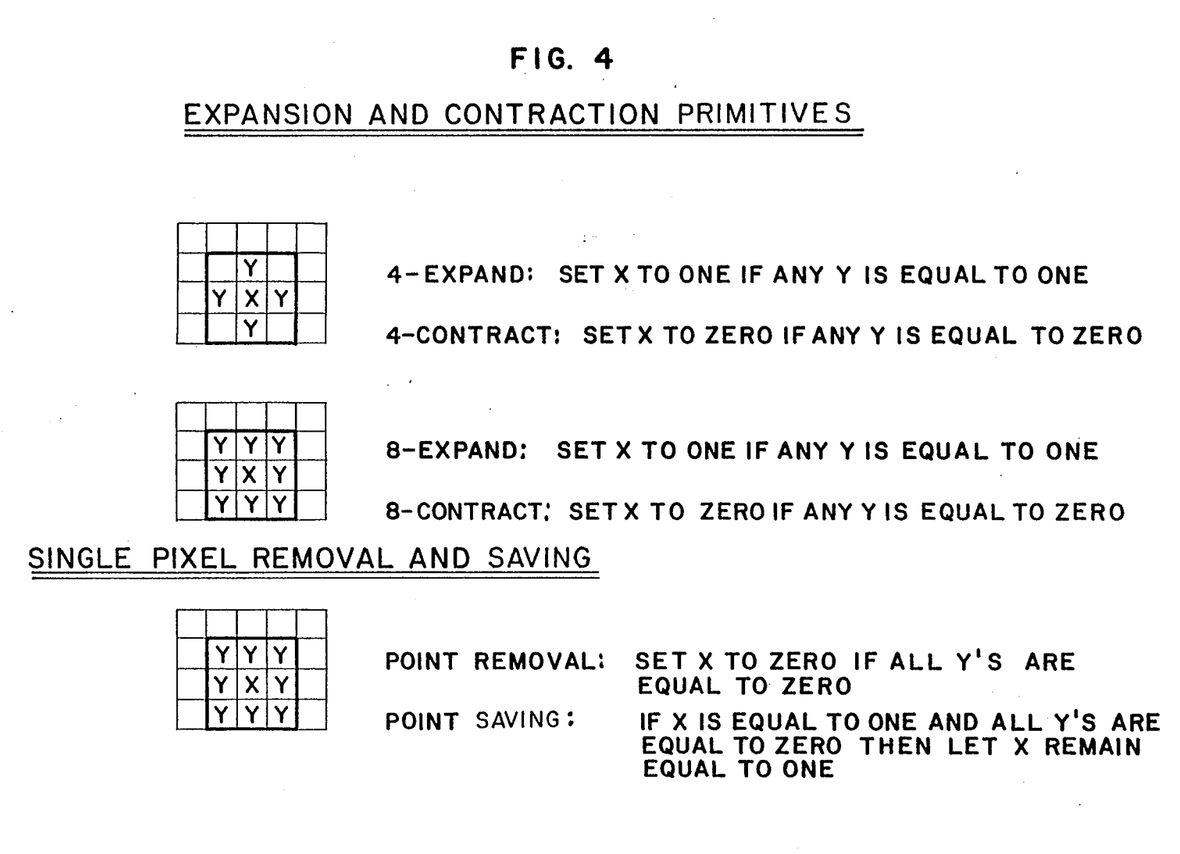
FIG. 4 shows a detailed description of the expansion and contraction algorithms used in the present invention.
Figure 5:
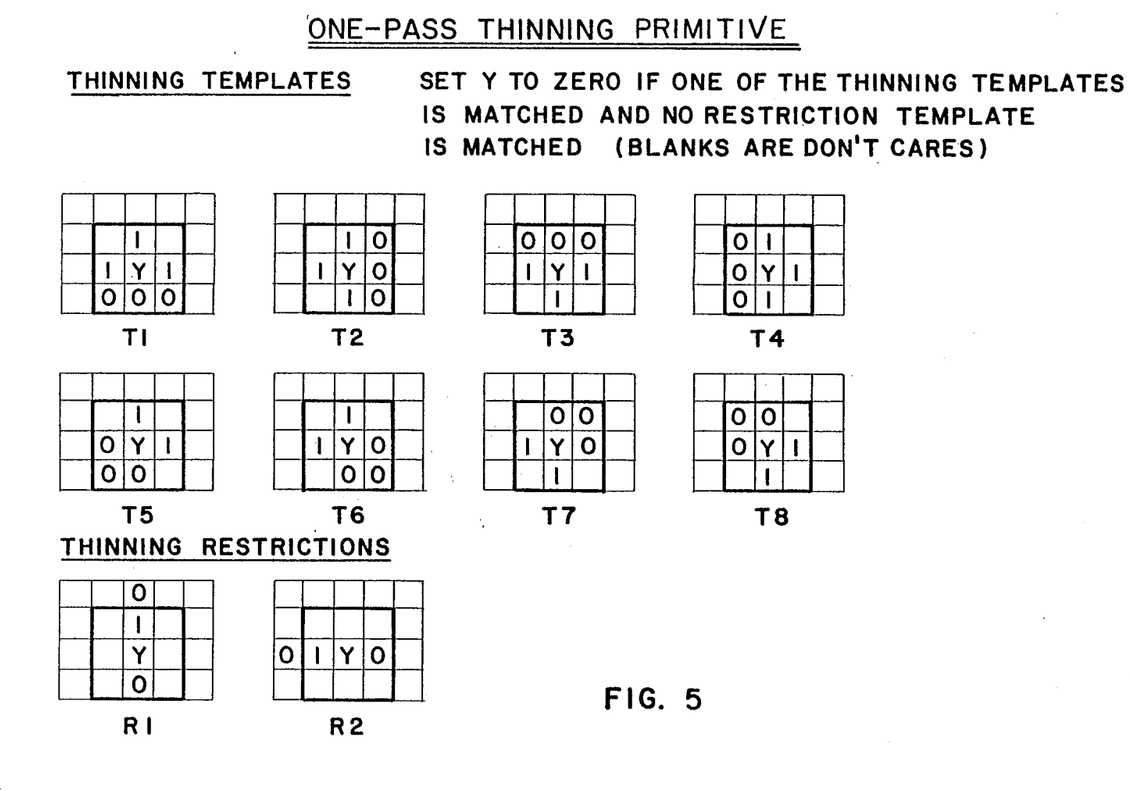
FIG. 5 shows a detailed description of the thinning templates and thinning restriction templates used in implementing the one-pass thinning algorithm of the present invention.
Figure 6:
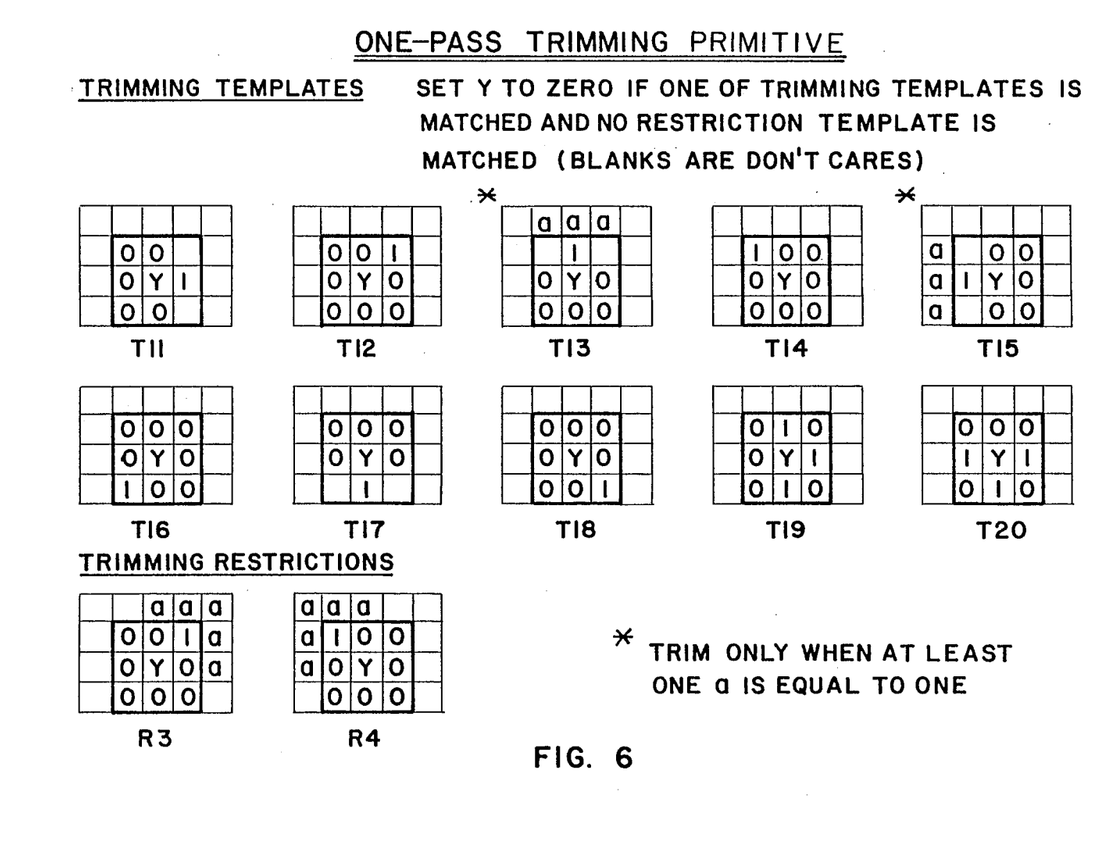
FIG. 6 shows a detailed description of the trimming templates and the trimming restriction templates used implementing the one-pass trimming algorithm of the present invention.

The primitives that the neighborhood transformation processor performs are shown in FIGS. 4, 5 and 6. The NOP primitive is not shown because it is intuitively obvious that no transformation takes place and the data is merely passed through. FIG. 4 shows the expand, contract pixel remove and pixel primitives. The implementation of these primitives is accomplished using digital logic which collects the relevant pixel value signals from the neighborhood and performs a logical decision, as shown in FIG. 3. For example, to implement the 4-expand algorithm shown in FIG. 4, one would logically OR neighborhood positions B8, B12, B14, B18, and the center of the neighborhood, B13 of processing neighborhood 500 in FIG. 3. If the center of the neighborhood is a logical 1 or any of the aforementioned surrounding pixels are at a logical 1, the 4-expand result would be a logical 1. The logic decision trees shown in FIG. 3 are hence implemented in digital logic with the trees wired in a dedicated fashion to the neighborhood positions required to perform that algorithm.

FIG. 5 shows the 1-pass thin primitive. In analyzing the structure of an object in an image, it is often necessary to represent and characterize the object in a compact and approximate representation. The 1-pass thin algorithm is used for reducing binary line drawings into sets of skeletons which represent the original pattern. Thinning is a shrinking operation which deletes from an object boundary all pixels, the removal of which does not disturb the general configuration and connectivity. It also guarantees that the final connected skeleton does not change or vanish even if the process continues for many iterations. There are eight basic thinning templates defined for the 1-pass thinning algorithm, and two restriction templates. The thinning templates are used for deleting boundary pixels while the restriction templates are used for preventing deletions of pixels if connectivity is broken. The thinning templates are shown in FIG. 5 and labeled T1 through T8. The thinning restriction templates are shown labeled R1 and R2. Any pattern that matches one of the thinning templates and does not match a thinning restriction will have its center pixel set to zero. The entire set of thinning templates are applied simultaneously to the image.

The trimming templates are shown in FIG. 6 and consist of ten trimming templates labeled T11 through T20, and two trimming restriction templates labeled R3 and R4. Trimming templates are used to reduce the noisy picture and trim off single-bit appendages from images. This results in a cleaner picture. However, the trimming templates as used also require trimming restriction templates. If trimming were used continuously, the object being trimmed would converge to a single pixel since the very ends would continue to be trimmed. To prevent this from happening the trimming restriction templates on a 4×5 neighborhood are used to detect a valid edge of an image and prevent the trim from taking place.

Figure 7:
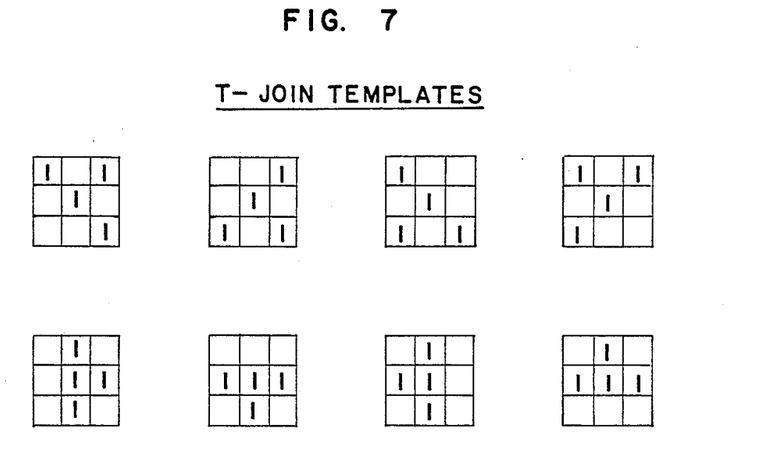
FIG. 7 shows a number of T-join templates which correspond to the feature detect templates used in the 3×3 subset of the 4×5 serial neighborhood transformation processor.

After the image data has been processed by the pipe elements in the pipelines, the data is passed to feature detectors to locate certain features of interest. The feature detectors shown in FIG. 1 operate in a similar fashion to the serial neighborhood transformation processors in that a transformation neighborhood identical to the type shown in FIG. 3 is used to detect specific configurations of pixels indicating specific types of features. The main type of features that are used in image processing are T-joins and B-joins which can be detected by using a 3×3 neighborhood shown in the dark line surrounding B7, B8, B9, B12, B13, B14, B17, B18 and B19 in FIG. 3. T-joins come in many varieties and are characterized by a single thin line attaching to another thin line, as shown in FIG. 7. The lines may attach to one another at any angle and from any direction. The basic T-joins would be lines approaching other lines from the eight basic compass directions that can be represented by a 3×3 pixel neighborhood. Several T-join templates that are used in the feature detector are shown in FIG. 7. The list of T-joins shown in FIG. 7 is not exhaustive. Those skilled in the art will recognize that many variations and permutations on these T-joins are possible.

Figure 8:
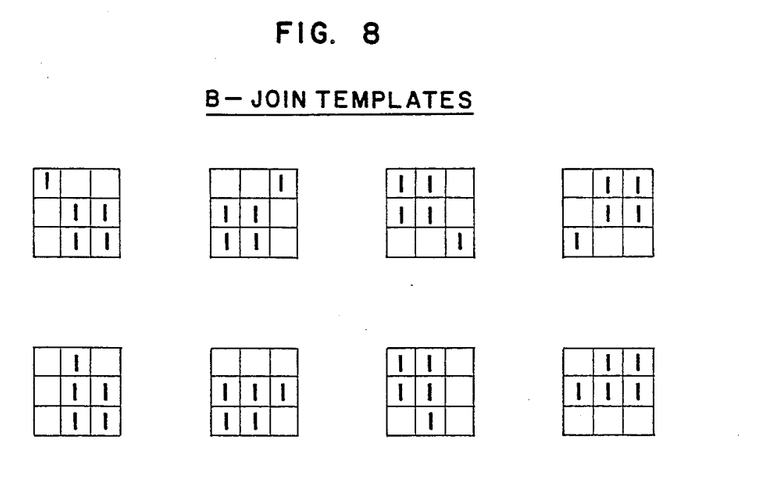
FIG. 8 shows a number of B-join templates which correspond to the feature detect templates used in the 3×3 subset of the 4×5 serial neighborhood transformation processor.

Several B-join feature detect templates are shown in FIG. 8 and are characterized by single lines approaching a block of pixels. This list of templates is also not exhaustive since many variations and permutations are possible, as those skilled in the art will readily recognize. The detection of any one of the aforementioned features is flagged by the feature detector and the information is placed on the output bus by the feature detectors of each image processing pipeline.

All of the forementioned transformation algorithms are used to modify digital pixel images to put them into a form which can be analyzed efficiently. For example, in the preferred embodiment of the present invention wherein the images being analyzed represent PWB's or PCB layers, the images are analyzed to detect flaws and faults. A simple example of a technique to detect shorts between adjacent electrically conducting lines would be to successively thin and trim the electrical interconnect lines until nothing but a skeleton remains. Then by using the feature detector shown in FIG. 1 and applying the feature detect templates of FIGS. 7 and 8, any connections between the electrical conductors could be detected.

Another example of the application of the present invention to verifying PWB's or PCB layers is to measure minimum spacing distances between the electrical conductors. This can be done by successively expanding the image a fixed number of times, which corresponds to the minimum spacing allowed between the conductors. Any conductors that would violate this minimum spacing rule would, on expansion, connect. The next step in this flaw detection algorithm would be to successively thin and trim the resulting expanded image until it is thinned down to its skeleton. Once again, a feature detector can be used to detect connections between the adjacent electrical conductors which would indicate a violation of the minimum spacing rule.

The aforementioned algorithms for detecting flaws in the interconnect can be accomplished by the present invention by programming the individual transformation stages within a pipe element to accomplish the successive trims, thins, expands and contracts necessary to implement the algorithm. In addition, several algorithms can be implemented and operated in parallel by programming the configuration of the pipe elements to accomplish the desired algorithm.

Although specific logic configurations and electrical configurations have been illustrated and described for the embodiment of the present invention set forth herein, it will be appreciated by those of ordinary skill in the art that any conventional logic or electrical arrangements which are calculated to achieve the same purpose may be substituted for the specific configurations shown. Thus, although conventional LSI and MSI logic is generally preferred due to its availability and speed, the logic described herein may be implemented through the use of conventional components or it may be all combined to a greater or lesser degree in a fewer number of VLSI components. In addition, it will be readily appreciated by those of ordinary skill in the art that although positive logic conventions have been here employed, negative logic conventions may be alternatively utilized where a 1-level corresponds to a lower voltage than a 0-level. Additionally, although specific logic components and associated conditions necessary for the operation of this system have been mentioned in order to describe the preferred embodiment of the present invention, complimentary logic configurations similar to those mentioned may alternatively be employed such as the substitution of NOR-type logic for NAND-type logic without any deviation from the concepts of the invention disclosed. Also, microprocessor, microcontroller or PAL control may readily be substituted for hardwired control, and vice versa, without departing from the spirit or scope of the present invention.

While the present invention has been described in connection with the preferred embodiment thereof, it will be understood that many modifications will be readily apparent to those of ordinary skill in the art, and this application is intended to cover any adaptations or variations thereof. Therefore, it is manifestly intended that this invention be limited only by the claims and the equivalents thereof.

What is claimed is:

1. A reconfigurable binary image processing apparatus adapted for two-dimensional image analysis, comprising:
    a data bus means having multiple inputs and outputs for receiving and sourcing a plurality of serial bit streams of single-bit digital data representing two-dimensional images;
    image source means for generating an original serial bit stream of single-bit digital data representing a scanned image and connected to a dedicated one of said plurality of serial bit streams on said data bus means;

a plurality of binary image processing elements capable of being arranged for parallel or serial processing, each comprising:

programmable input means connected to said data bus means for programmably selecting one of said serial bit streams from said data bus means, for receiving the selected one of said serial bit streams and for arranging said processing elements into a reconfigurable processing configuration;

output means connected to a dedicated one of said plurality of serial bit stream on said data bus means for sourcing a processed serial bit stream of single-bit digital data;

a plurality of single-bit programmable serial neighborhood processing stages arranged as a cascade, the first of which being attached to said programmable input means and the last of which being attached to said output means, each of which having memory capable of storing a plurality of bits of said single-bit digital data processing element control means attached to said programmable input means for causing said input means to select one of said plurality of serial bit streams from said data bus means and for enabling a reconfigurable arrangement of the processing elements under program control; and stage control means attached to each of said single-bit serial neighborhood processing stages for selecting one of a plurality of image transformation algorithms to be performed upon said single-bit digital data of said serial bit;

such that, at least two of said binary image processing elements may be configured in a series by programming said input means of one of said binary image processing elements to select said dedicated one of said plurality of serial bit streams on said data bus means corresponding to said output means of another of said binary image processing elements.

2. The apparatus according to claim 1 further comprising:

a further plurality of said binary image processing elements arranged for parallel processing, each having programmable input means connected to said data bus means for selectively receiving said serial bit streams and for arranging said further plurality of processing elements into a reconfigurable processing configuration, and each having output means connected to a feature detect means; and said feature detect means operable for applying predefined templates to one of said serial bit streams of single-bit digital data and further for indicating the detection of a specific feature.

3. The apparatus according to claim 2 wherein each of said single-bit programmable serial neighborhood processing stages includes:

an n-line by m-column array of shift registers having a specific center of interest and connected for shifting said single-bit digital data of said serial bit streams along each of said lines of said array;

a plurality of serial shift memories connected to said n-line by m-column array for transferring said single-bit digital data of said serial bit streams from one line to the next;

digital logic means attached to said n-line by m-column array for receiving said single-bit digital data of said serial bit stream and for performing a plurality of single-bit transformations upon said digital data at said center of interest based upon matching templates; and programmable output selection means attached to said digital logic means for selecting one of said plurality of single-bit transformations.

4. The apparatus according to claim 3 wherein said digital logic means includes a plurality of thinning templates and a plurality of thinning restrictions concurrently applied to said digital data of said serial bit streams to produce a single-pass, single-stage thin transformation on all sides of the image.

5. The apparatus according to claim 4 wherein said thinning templates and said thinning restrictions produce a single-pass, single-stage thin transformation to remove digital data from all directions surrounding the image without breaking the connectivity of a skeletal representation of the image and without eliminating 2×2 square pixel images 2×2 L-shaped pixel images on all sides of the image.

6. The apparatus according to claim 3 wherein said digital logic means includes a plurality of trimming templates and a plurality of trimming restriction concurrently applied to said digital data of said serial bit streams to produce a single-pass, single-stage trim transformation on all sides of the image.

7. A serial neighborhood transformation stage adapted for performing an all-sided single-pass thin operation within a single stage of a single-bit binary image processing apparatus, comprising:

data input means for receiving a serial bit stream of digital data representing single-bit pixels of a two-dimensional raster-scanned image;

an n-line by m-column matrix of single-bit shift registers connected for receiving said serial bit stream of digital data and operable for holding a subset of said digital data of said serial bit stream and having an assigned center of interest;

template means connected to said matrix for performing a logical decision based upon the value contained in said matrix for determining when a valid thinning condition exists for transforming said center of interest to remove digital data from all direction surrounding the image without breaking the connectivity of a skeletal representation of the image and without eliminating 2×2 square pixel images or 2×2 L-shaped pixel images;

restriction means connected to said matrix and said template means for preventing said template means from transforming said center of interest if connectivity within the two-dimensional raster-scanned image would be broken by said template means; and data output means connected to said center of interest of said matrix for presenting transformed data.

8. A method of processing serial image data by performing a single-pass thin transformation in a single stage of a serial neighborhood processor, the steps comprising:

(a) receiving serial bit stream of single-bit digital pixel data representing a raster-scanned image to be processed;

(b) passing said serial bit stream of single-bit digital pixel data through an n×m matrix arranged in a row/column array such that said matrix contains a portion of the serial bit stream of single-bit digital pixel data representative of the raster-scanned image;

(c) performing a single-pass, single-stage thin transformation on the raster scanned image by removing selected excess single-bit digital pixel data from the serial bit stream by concurrently applying thinning templates and thinning restrictions to the serial bit stream passing through the matrix to remove single-bit digital pixel data from all directions without breaking the skeletal connectivity of the raster-scanned image and without eliminating 2×2 square pixel images or 2×2 L-shaped pixel images; and (d) outputting a serial bit stream of transformed digital pixel data representing a thinned image from the raster-scanned image.

9. A serial neighborhood transformation stage adapted for performing a single-pass trim operation within a single stage of a single-bit binary image processing apparatus, comprising:

data input means for receiving a serial bit stream of digital data representing single-bit pixels of a two-dimensional raster-scanned image;

an n-line by m-column matrix of single-bit shift registers connected for receiving said serial bit stream of digital data and operable for holding a subset of said digital data of said serial bit stream and having an assigned center of interest;

template means connected to said matrix for performing a logical decision based upon the values contained in said matrix for determining when a valid trimming condition exists for transforming said center of interest to remove excess digital data noise surrounding the image without breaking the connectivity of a skeletal representation of the image;

restriction means connected to said matrix and said template means for preventing said template means from transforming said center of interest if connectivity within the two-dimensional raster-scanned image would be broken by said template means; and data output means connected to said center of interest of said matrix for presenting transformed data.

10. A method of processing serial image data by performing a single-pass trim transformation in a single stage of a serial neighborhood processor, comprising the steps of:

(a) receiving serial bit stream of single-bit digital pixel data representing a raster-scanned image to be processed;

(b) passing said serial bit stream of single-bit digital pixel data through an n×m matrix arranged in a row/column array such that said matrix contains a portion of the serial bit stream of single-bit digital pixel data representative of the rester-scanned image;

(c) performing a single-pass, single-stage trim transformation on the raster scanned image by removing selected appended single-bit digital pixel data representative of noise from the serial bit stream by concurrently applying trimming templates and trimming restrictions to the serial bit stream passing through the matrix to remove excess noise pixels without breaking the skeletal connectivity of the raster-scanned image; and (d) outputting a serial bit stream of transformed digital pixel data representing a trimmed image from the raster-scanned image.

* * * * *